United States Patent

Lang

[15] 3,659,571

[45] May 2, 1972

[54] ELECTRONIC SPEED REGULATING ARRANGEMENT FOR INTERNAL COMBUSTION ENGINES

[72] Inventor: Herbert Lang, Bissingen, Germany
[73] Assignee: Robert Bosch GmbH, Stuttgart, Germany
[22] Filed: Mar. 9, 1970
[21] Appl. No.: 22,743

[30] Foreign Application Priority Data

Mar. 8, 1969 Germany .................... P 19 11 826.6

[52] U.S. Cl. .......................................... 123/102, 123/148 S
[51] Int. Cl. ................................................ F02d 11/10
[58] Field of Search .................................. 123/102

[56] References Cited

UNITED STATES PATENTS 3,407,793  10/1968  Lang ........................................ 123/102
3,425,401  2/1969   Lang ........................................ 123/102

Primary Examiner—Laurence M. Goodridge
Attorney—Michael S. Striker

[57] ABSTRACT

An electronic arrangement for regulating the speed of internal combustion engines, particularly diesel engines. A valve is controlled for regulating the quantity of fuel to be injected into the engine. A bistable multivibrator has its output connected to the valve for controlling the opening thereof. A comparator is connected to the input of the bistable multivibrator and receives output pulses from a first monostable multivibrator. These pulses from the first monostable multivibrator have a duration which is a function of the state or position of the valve. A second monostable multivibrator applies input pulses to the other input of the comparator. These input pulses from the second monostable multivibrator have a duration which is a function of the speed of the engine. The input pulses have a duration which is made variable corresponding to a predetermined speed-load characteristics of the engine.

13 Claims, 3 Drawing Figures

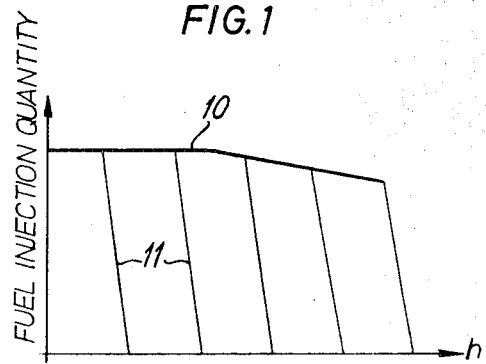
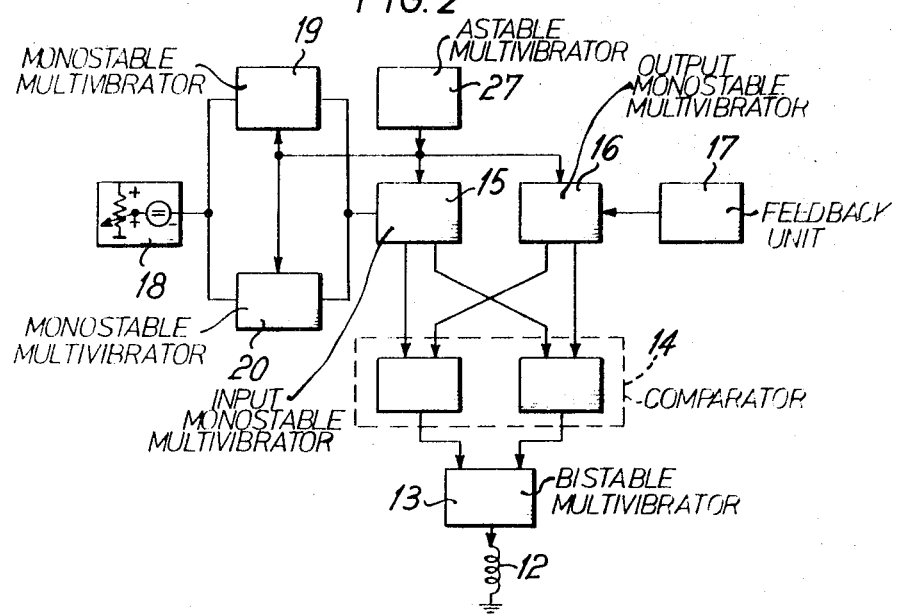

Patented May 2, 1972

INVENTOR
Herbert LANG

ELECTRONIC SPEED REGULATING ARRANGEMENT FOR INTERNAL COMBUSTION ENGINES

BACKGROUND OF THE INVENTION

The present invention relates to an electronic regulator for the purpose of regulating the rotational speed of an internal combustion engine. The arrangement is particularly adapted to diesel engines, and within the field of operation of the speed-load characteristics of the engine. The engine has a positioning element for measuring the quantity of fuel to be injected. This positioning element is dependent upon the position of a transducer in the form of, for example, the gas pedal. The positioning element is also dependent upon the rotational speed of the engine.

Regulating arrangements of this type are mainly used for regulating diesel engines in motor vehicles. The regulating arrangements are subjected to considerably large temperature variations and they must operate precisely within a temperature range of at least 100° C. In particular, such temperature range during which precise operation is to take place and without any substantial variations, is between −20° C. and +80° C.

Accordingly, it is an object of the present invention to provide a regulator which operates reliably and precisely, independent of the aforementioned temperature variations. It is also an object of the present invention to provide such a regulating arrangement in which the aging characteristics of the electronic elements do not affect the precision and functional operation of the regulator.

The objects of the present invention can be achieved by providing that the positioning element be interconnected with a bistable multivibrator which is switchable from pulses derived from a comparator circuit. The comparator compares output parameter pulses with variable duration achieved through a monostable multivibrator. These output pulses are a function of the position of the positioning element. The comparison of the output parameter pulses is made with respect to the input parameter pulses derived from a transducer positioned as a function of the rotational speed of the engine, and from a monostable multivibrator with variable delay time. The transducer may also provide other operating parameters in certain cases. The arrangement is such that the pulse duration of the input parameter pulses correspond to a predetermined speed-load characteristic field, with respect to which at least one monostable multivibrator may be made variable.

In this solution to the problem, the semi-conductor elements which are extensively temperature dependent and which are situated in the multivibrators, pulse duration comparator and pulse driving stages, operate between two definite operating points corresponding to "on-off" points. The remaining transistor or diode characteristics are passed through in a very short period of time. As a result, only a very low heating takes places of the semi-conductor crystal. The operating points are chosen, thereby, so that the external temperature variations and variations in the power supply voltage have only a substantially small influence upon the semi-conductor characteristics, and thereby upon the precision of the regulator. The same situation applies to the aging characteristics of the components, whereby variations in the characteristics of the components due to aging is held as a minimum effect upon the precision of the regulator.

SUMMARY OF THE INVENTION

An electronic regulating arrangement for regulating the speed of internal combustion engines, particularly diesel engines. A measuring device or valve determines the quantity of fuel to be injected into the engine. A transducer provides the signal as a function of the speed of the engine for actuating the valve in accordance with such speed. A bistable multivibrator is connected to the valve, and a comparator, in turn, feeds the bistable multivibrator. The comparator has a first input connected to a first monostable multivibrator and receives on this first input output pulses with duration as a function of the state of the valve. The second input to the comparator is derived from a second monostable multivibrator which applies to the comparator input pulses with duration as a function of the speed of the engine. These input pulses applied to the comparator are made variable corresponding to a predetermined speed-load characteristics of the engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a graphical representation of the injected fuel-speed characteristics of a diesel engine;

FIG. 2 is a block diagram of the regulator for the diesel engine; and

DESCRIPTION OF THE PREFERRED EMBODIMENTS

Figure 3:
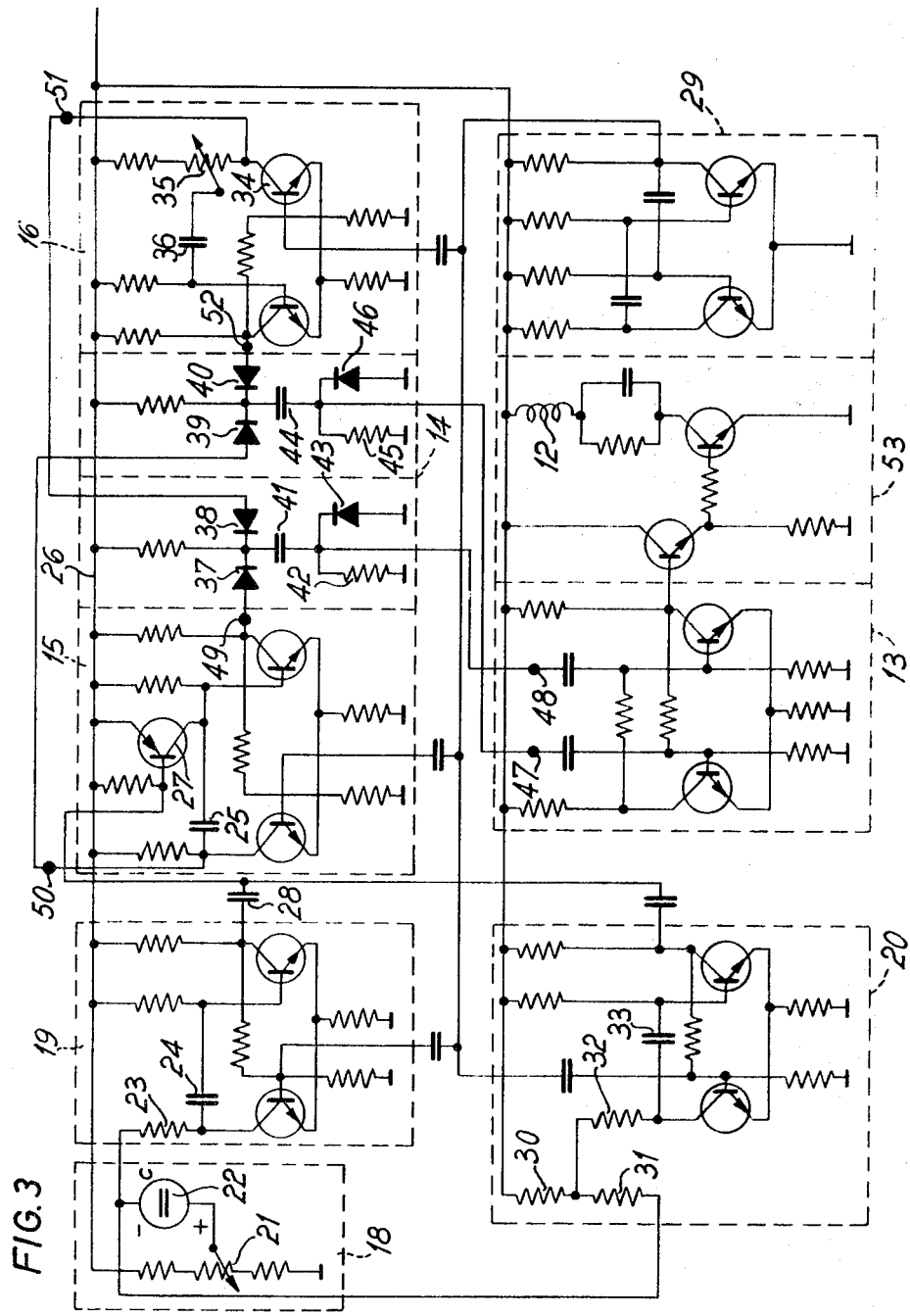
FIG. 3 is a circuit diagram of the regulator of FIG. 2.

Referring to the drawing, and in particular to FIG. 1, the operating characteristics of a diesel engine are shown therein, with the abscissa as the rotational speed $n$ and the ordinate representing the quantity of injected fuel. The full-load limit characteristic line is designated by the reference numeral 10, whereas the inclined lines 11 represent the regulating lines between the full-load line 10 and the abscissa of the graphical representation of FIG. 1.

The regulator shown in block diagram in FIG. 2, operates within the characteristics of FIG. 1. The regulator actuates a positioning member 12 in the form of a magnetic valve. This valve serves to position a regulating rod, not shown, of an injection pump of an internal combustion engine. A bistable multivibrator 13 is connected in front of the positioning element 12 having two points of operation. This bistable multivibrator 13 is switched to one or its other state, depending upon the signals transmitted from a circuit 14 for comparing pulse durations. The comparator circuit 14 serves to compare pulses derived from monostable multivibrators 15 and 16. The monostable multivibrator 15 applies a pulse to this circuit 14, which has a duration representing the input quantity or desired value. The monostable multivibrator 16, on the other hand, provides a pulse with duration representing the output quantity or actual prevailing value. The duration of the output pulse derived from the monostable multivibrator 16 is made dependent upon the position of the fuel injection pump regulating rod position, which is not shown. This position of the regulating rod, as determined by the duration of the output pulse, is applied to the regulating circuit through a feedback arrangement 17. The duration of the input pulse derived from the monostable multivibrator 15, is made dependent upon the rotational speed of the engine and the position of the gas pedal. These variables of rotational speed and gas pedal position are applied to the monostable multivibrator 15, through further monostable multivibrators 19 and 20. When required, still further operating parameters of the internal combustion engine can be taken into account. The entire triggering of the monostable multivibrators 15, 16, 19 and 20, is realized through an astable multivibrator 27. The circuit diagram of FIG. 3 illustrates the detailed construction of the regulator and serves to illustrate the operation of the unit. In conjunction with this circuit diagram of FIG. 3, only the circuits required towards understanding for those skilled in the art, are described. The construction and operation of multivibrators is well known in the art, and is for this reason not discussed in detail.

In the input generator unit 18, a D.C. voltage speed transducer 22 applies a voltage to the movable contact of a variable resistor 21. The winding of this variable resistor is connected between two fixed resistors constituting a voltage divider. The speed transducer 22 supplies a voltage which is dependent upon the speed of the engine. The variable resistor 21 is set or positioned in accordance with the position of the gas pedal, and the difference in voltages realized through positioning this variable resistor 21 in this manner, and the potential applied to the sliding contact through the transducer 22, is applied to a capacitor 24. This capacitor 24 lies within a timing circuit or network of the monostable multivibrator 19, and is charged through this difference voltage, through the resistor 23. Due to the different and large charging of the timing capacitor 24, different pulse durations are realized from the monostable multivibrator 19.

The monostable multivibrator 15 which provides input pulses of constant duration, is provided with a switching transistor 27 having a collector connected with the timing capacitor 25 of this multivibrator 15. The constant duration pulses emitted by the monostable multivibrator 15 correspond to the full-load position of the regulating rod of the fuel injection pump. The emitter of the switching transistor 27 is connected to a common positive supply line 26 of the regulator. By applying a negative potential to the base of this transistor 27, the timing capacitor 25 can be abruptly discharged through the collector-emitter path of the transistor 27. This negative voltage is applied to the base of the transistor 27, through a coupling capacitor 28, when the monostable multivibrator 19 has returned to its stable state. When, now, the pulse duration of the two monostable multivibrators 15 and 19 are identical, the switching transistor 27 first conducts when the timing capacitor 25 is already discharged. This takes place upon common or simultaneous triggering action through the astable multivibrator 29. When, however, the regulator operates at a point on the regulating characteristic line 11 of the graphical representation in FIG. 1, the pulse durations from the monostable multivibrator 19 and resulting from the generator 18, are shorter than the input pulses derived from the monostable multivibrator 15. As a result, when the monostable multivibrator 19 is returned to its stable state, the switching transistor 27 becomes already turned on, when the timing capacitor 25 has not as yet been discharged fully. Through such turning on action of the switching transistor 27, the timing capacitor 25 becomes abruptly and suddenly discharged. The input pulses corresponding to the position of the operating point of the regulator on the operating characteristics are, furthermore, shortened in duration.

In a manner similar to that described above, the input pulses become also shortened in duration when the operating point is situated upon the falling portion of the full-load limit line 10. In this case, the switching transistor 27 is turned on by the monostable multivibrator 20. In order that a correspondingly shorter duration is realized than in the case when the operating point is situated upon a regulating line 11, the difference voltage of the generator 18 is applied through a voltage divider consisting of resistors 30 and 31, and a resistor 32. This resulting voltage from the resistor 32 is then applied to the timing capacitor 33 of the monostable multivibrator 20.

The output pulses representing the output parameter, have a duration corresponding to the position of the regulating rod of the fuel injection pump. These pulses are produced through the monostable multivibrator 16. A variable resistor 34 has a sliding contact 35 mechanically coupled to the regulating rod of the fuel injection pump. Thus, the sliding contact or variable resistor made of elements 34 and 35, is positioned in accordance with the position of the regulating rod. The output voltage from the sliding contact 35 is applied in the timing circuit of the monostable multivibrator 16, so that the discharge current of the timing capacitor 36 flows through this variable resistance 34. Consequently, depending upon the resistance value of this variable resistor 34, the pulse duration of the output pulses becomes varied.

The pulse durations of the output pulses and the input pulses become compared in the comparator circuit 14. This pulse duration comparator circuit 14 is provided with two pairs of diodes 37,38 and 39,40. The cathodes of the diodes 37 and 38 are connected together, as is the case with the diodes 39 and 40. Connected to the junction of the cathodes of diodes 37 and 38, is a differentiating circuit composed of capacitor 41, a resistor 42, and a diode 43. One electrode of the capacitor 41 is connected to the junction of the diode 43 and resistor 42. The other electrode of the capacitor 41 is connected to the junction of the cathodes of the diodes 37 and 38. The junction of resistor 42 and diode 43 of the differentiating circuit, furthermore, is connected to the input 47 of the bistable multivibrator 13. The junction of the diodes 39 and 40 is connected to a similar differentiating circuit consisting of a capacitor 44, a resistor 45, and a diode 46. The junction of the capacitor 44, resistor 45 and diode 46, is connected to a second input 48 of the bistable multivibrator 13. The anode of the diode 37 is connected to a first output 49 of the monostable multivibrator 15, whereas the anode of the diode 38 is connected to a first output 51 of the monostable multivibrator 16. The anode of the diode 39 is connected to a second output 50 of the monostable multivibrator 15, whereas the anode of the diode 40 leads to a second output 52 of the monostable multivibrator 16.

At every first output of the monostable multivibrators 15 and 16, is a binary signal which is opposite in sign to the second output of the respective multivibrator. If, for example, the positive pulse from the monostable multivibrator 15 is longer than the inverted pulse from the monostable multivibrator 16, then a positive pulse appears at the junction of the diodes 37 and 38 during the time interval that the pulse from the monostable multivibrator 15 is longer than the inverted pulse from the monostable multivibrator 16. This situation holds for simultaneous actuation or triggering by the astable multivibrator 29.

The spike pulse resulting from the differentiating process reaches the second input 48 of the bistable multivibrator 13. As a result, this bistable multivibrator switches to the corresponding state, and the magnetic valve becomes actuated through an amplifier stage 53. The actuation of the magnetic valve is such that the regulating rod of the fuel injection pump is drawn or pulled against the stop or limit position. The sliding contact 35 of the variable resistor 34 becomes, thereby, positioned so that the duration of the output pulses of the monostable multivibrator 16 becomes varied until it is equal to the pulse duration of the pulse provided by the input monostable multivibrator 15. A pulse now is applied to the first input 47 of the bistable multivibrator 13, through the pair of diodes 39 and 40, and the differentiating network 44,45,46. This pulse applied to the first input 47 of the bistable multivibrator 13 switches this circuit 13 to its other state and thereby closes the magnetic valve 12 through the amplifier stage 53.

The use and application of the regulating arrangement described above, is not limited to the actuation of a regulating rod of a positioning element. For example, the regulating arrangement can also be used in conjunction for influencing the fuel injection duration of a fuel injection valve of an internal combustion engine.

It will be understood that each of the elements described above, or two or more together, may also find a useful application in other types of constructions differing from the types described above.

While the invention has been illustrated and described as embodied in internal combustion engine regulating arrangements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is set forth in the appended

1. An electronic arrangement for regulating the speed of an internal combustion engine, comprising, in combination, measuring means having an active and inactive state and connected to actuate the fuel control of said engine to increase or decrease the quantity of fuel to be injected for determining the quantity of fuel to be injected into said engine as a function of gas pedal position and engine speed; bistable multivibrator means having a pair of outputs connected to said measuring means and actuating said measuring means for regulating the quantity of fuel to be injected by switching from one stable state to the other; comparator means having a pair of input connections and an output connected to the input of said bistable means for comparing pulse durations at its input connections and switching said bistable multivibrator means; first monostable multivibrator means responsive to actuation of said measuring means and connected to one of said inputs of said comparator means and applying to said input output pulses with a duration which is a function of the state of said measuring means and therefore the quantity of fuel to be injected; second monostable multivibrator means connected to the other of said second input connections of said comparator and applying to said comparator input pulses with a duration which is a function of the speed of said engine and gas pedal position, said input pulses being of variable duration corresponding to a predetermined speed-load characteristics of said engine; and speed and load transducer means connected to said second monostable multivibrator means for actuating said second monostable multivibrator as a function of the speed of said engine.

2. The arrangement as defined in claim 1 including a timing capacitor within said second monostable multivibrator means; and switching transistor means connected to said timing capacitor means for varying the pulse durations of said input pulses.

3. The arrangement as defined in claim 2 including astable multivibrator means actuated through the output of at least one monostable multivibrator means.

4. The arrangement as defined in claim 3 wherein said astable multivibrator means is actuated with pulses having duration dependent upon the position of the gas pedal of said engine, said astable multivibrator means also being actuated with pulses dependent upon the speed of said engine.

5. The arrangement as defined in claim 4 including timing capacitor means for varying the duration of said pulses as a function of the position of said gas pedal.

6. The arrangement as defined in claim 1 including variable resistor means in said first monostable multivibrator means for varying the pulse durations of said output pulses.

7. The arrangement as defined in claim 1 including two pairs of diodes in said comparator means, the cathodes of one pair of diodes and the cathodes of the other pair of diodes being connected together.

8. The arrangement as defined in claim 7 wherein the anode of a first one of said diodes is connected to a first output of said second monostable multivibrator, and the anode of a second diode of one diode pair is connected to a first output of said first monostable multivibrator means.

9. The arrangement as defined in claim 8 wherein the anode of the diode of the other pair of diodes is connected to a second output of said second monostable multivibrator means, and the anode of the second diode of said other pair of diodes is connected to the second output of said first monostable multivibrator means.

10. The arrangement as defined in claim 9 including first differentiating network means connected between the junction of one diode pair and one input of said bistable monostable multivibrator means; and second differentiating network means connected between the junction of the other pair of diodes and another input of said bistable multivibrator means.

11. The arrangement as defined in claim 1 including astable multivibrator means for switching said monostable multivibrator means.

12. The arrangement as defined in claim 1 including amplifying means connected between said bistable multivibrator means and said measuring means.

13. The arrangement as defined in claim 1 wherein said engine comprises a diesel engine.

* * * * *